United States Patent [19]
Cheng et al.

[11] Patent Number: 5,884,324
[45] Date of Patent: Mar. 16, 1999

[54] AGENT FOR REPLICATING DATA BASED ON A CLIENT DEFINED REPLICATION PERIOD

[75] Inventors: Josephine M. Cheng; HongHai Shen; Shu-jen Wang, all of San Jose, Calif.

[73] Assignee: International Business Machines Corporation, Armonk, N.Y.

[21] Appl. No.: 684,011

[22] Filed: Jul. 23, 1996

[51] Int. Cl.$^6$ .................................................. G06F 17/30
[52] U.S. Cl. ........................................................ 707/201
[58] Field of Search ........................... 707/1, 3, 10, 201; 395/200.33, 200.47–200.49; 711/141–146

[56] References Cited

U.S. PATENT DOCUMENTS

| | | | |
|---|---|---|---|
| 4,096,567 | 6/1978 | Millard | 364/200 |
| 4,422,145 | 12/1983 | Sacco et al. | 364/300 |
| 4,774,655 | 9/1988 | Kollin et al. | 364/200 |
| 5,010,478 | 4/1991 | Deran | 364/200 |
| 5,029,104 | 7/1991 | Dodson et al. | 364/514 |
| 5,046,002 | 9/1991 | Takashi et al. | 364/200 |
| 5,175,849 | 12/1992 | Schneider | 395/600 |
| 5,179,660 | 1/1993 | Devany et al. | 395/600 |
| 5,224,212 | 6/1993 | Rosenthal et al. | 395/250 |
| 5,291,594 | 3/1994 | Sekiguchi et al. | 395/600 |
| 5,299,197 | 3/1994 | Schlafly | 370/94.1 |
| 5,357,618 | 10/1994 | Mirza et al. | 395/400 |
| 5,408,653 | 4/1995 | Josten et al. | 395/600 |
| 5,434,994 | 7/1995 | Shaheen et al. | 707/202 |
| 5,553,279 | 9/1996 | Goldring | 707/201 |
| 5,581,704 | 12/1996 | Barbara et al. | 711/141 |
| 5,588,147 | 12/1996 | Neeman et al. | 707/1 |
| 5,613,155 | 3/1997 | Baldiga et al. | 395/825 |
| 5,615,337 | 3/1997 | Zimowski et al. | 707/3 |
| 5,634,122 | 5/1997 | Loucks et al. | 707/8 |
| 5,682,514 | 10/1997 | Yohe et al. | 395/445 |
| 5,687,373 | 11/1997 | Holmes et al. | 395/682 |
| 5,689,697 | 11/1997 | Edwards et al. | 395/825 |
| 5,713,017 | 1/1998 | Lin et al. | 395/608 |

OTHER PUBLICATIONS

Baum, D. "Architecture With the Works," InformationWeek, n.586 (Jul. 1, 1996), pp. 42–45.

"Xcellenet Announces New System Software Platform for Remote and Mobile Computing," PR Newswire (Apr. 22, 1996), p. 422.

"Sybase and BMC Software Announce Joint Technology Agreement to Develop Mainframe Replication Agents for Distributed Environments," PR Newswire (Apr. 16, 1996), p. 416.

"Sybase Launches Middleware for Universal Connectivity," PR Newswire (Apr. 16, 1996), p. 416.

"Sybase Offers First Heterogenous Replication Solution for Oracle Databases," PR Newswire (Jun. 27, 1995), p. 627.

Emmerson, B. "The Internet Goes Mobile," Communications International, v.23, n.10 (Oct. 1996), pp. 39–40.

Marzullo, K. et al. "Supplying High Availability With a Standard Network File System," IEEE 8th Internat'l Conf. on Distributed Computing, Jun. 1988, pp. 447–453.

Siegel, A. et al. "Deceit: A Flexible Distributed File System," Summer 1990 USENIX Conf., Anaheim, CA (Jun. 1990), pp. 51–61.

*Primary Examiner*—Maria N. Von Buhr
*Attorney, Agent, or Firm*—Merchant, Gould, Smith, Edell, Welter, & Schmidt

[57] ABSTRACT

A method, apparatus, and article of manufacture for replicating data stored in source database tables in a database management system implemented by a server at a remote client implemented on a client computer. The method comprises the steps of receiving a subscription message from the client computer, wherein the subscription message specifies a remote client database table and a data replication period, receiving a change log from the database management system at the data replication agent, generating a table of changed data by using the change log, data replication period, and source database table to reconstruct changes to the remote client database table, and transmitting the changed data table to the remote client.

21 Claims, 5 Drawing Sheets

AGENT FOR REPLICATING DATA BASED ON A CLIENT DEFINED REPLICATION PERIOD

BACKGROUND OF THE INVENTION

1. Field of the Invention.

The present invention relates generally to methods for accessing information stored in a database management system (DBMS), and in particular, an agent for providing replicated data from the database management system to a remote user.

2. Description of the Related Art.

Large-scale integrated database management systems provide an efficient, consistent, and secure means for storing and retrieving vast amounts of data. This ability to store, retrieve, and manage massive amounts of information has become a virtual necessity in business today.

Usually, the process of obtaining information from the DBMS is highly interactive, requiring short periods of high bandwidth, low-latency communications between the end user and the DBMS, followed by extended periods with little or no communications traffic. Because local area network (LAN) wide area network (WAN) communications are high bandwidth and low cost, the user is typically provided access to the database via a desktop computer coupled directly by a (LAN) or a laptop computer coupled to the LAN via the Public Switched Telephone Network (PSTN). This arrangement is the well known client-server architecture.

Businesses using integrated database management systems (DBMSS) have become increasingly mobile and service-oriented, raising the need for timely and inexpensive mobile access to database information. Mobile users also frequently require access to information which is stored in different DMBSs. Mobile communications are available through cellular telephone, paging and other radio networks, but using these communication links for providing access to DBMSs is problematic. Cellular telephone communications offer low bandwidth, and are quite expensive, and often unreliable. Remote paging networks provide fairly inexpensive reliable communications, but at the cost of low-bandwidth and high data latency.

One of the many capabilities offered by database management systems is a data replication function. This allows the user to retrieve updated data information pertinent to previous database requests as the data becomes available in the DBMS. In current systems, the data replication function is implemented as follows: the client sends a request to the DBMS via a replication server and waits for a response. Then, the DBMS computes all essential data (using changed data, logs, and relational joins) required to allow the client to update the resident table. This process is repeated for each table that the client subscribes to. During the above operations, the communications link between the client and the replication server is continually maintained. Since several join and other time-consuming database operations are required, it is not economical to maintain mobile communications links while the DBMS performs the indicated operations. Further, the process must be repeated for each client subscribed table, requiring frequent information exchange between the client and the replication server. The communications link must also be configured to support different protocols in order for the client to access the base table in different platforms, and it is difficult and expensive to optimize the mobile communications link for different protocols. There is therefore a need for clients to interact with a replication server in an asynchronous, disconnected mode.

SUMMARY OF THE INVENTION

To overcome the limitations in the prior art described above and to overcome other limitations that will become apparent upon reading and understanding the present specification, the present invention discloses a method, apparatus, and article of manufacture for replicating data stored in source database tables in a database management system. The method is implemented by both a server computer and a client computer.

The present invention satisfies this need by providing a data replication agent. The data replication agent reduces mobile link communications because it collects all of the data for the remote client database tables all at once. Further, by eliminating direct mobile link to DBMS communications, the data replication agent simplifies optimization of mobile communications, because packet level protocols for the mobile link can be disregarded. The data replication agent also automates data conversion because it collects data in a format suitable for the remote user platform, thereby eliminating the need for configuring the mobile communications link for a special protocol. The data replication agent also collects source data residing in different platforms, supports multiple communication media, such as TCP/IP, wireless networks, and file transfers via telephone, and multiple channel client notification, allowing a push/pull user interaction mode. The present invention also integrates easily with existing DBMSs, and remote user platforms.

The invention comprises the steps or elements of receiving a subscription message from a client computer, wherein the subscription message specifies a remote client database table and a data replication period, receiving a change log from the database management system at the data replication agent, generating a table of changed data by using the change log, data replication period, and source database table to reconstruct changes to the remote client database table, and transmitting the changed data table to the remote client.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

1. System Architecture

Figure 1:
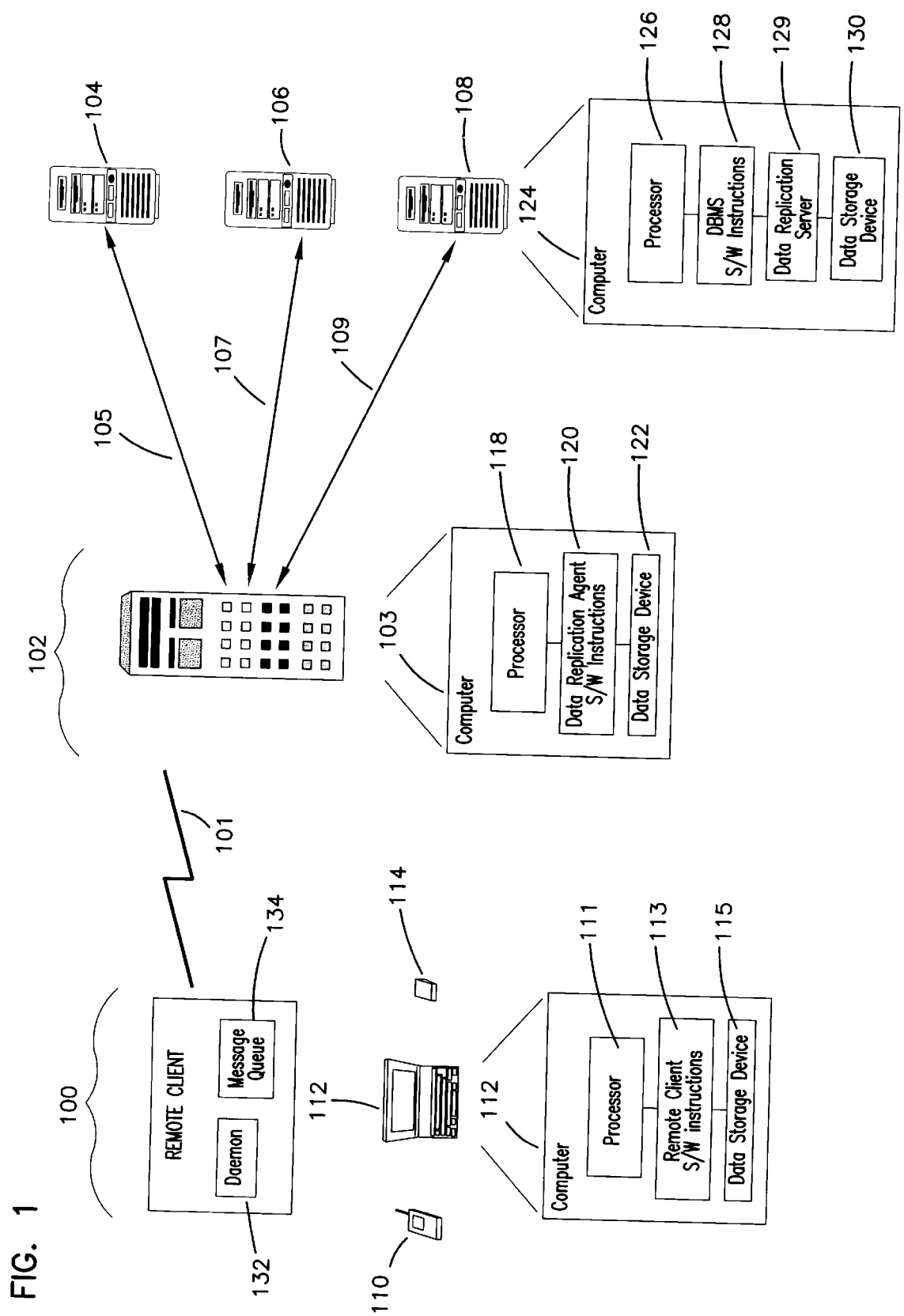
FIG. 1 is an architectural block diagram of the system.

FIG. 1 is a diagram illustrating the overall architecture and showing an exemplary hardware environment of the present invention. A remote client 100 communicates with the data replication agent 102 via a mobile link 101. The data replication agent 102 communicates with one or more database management systems (DBMSs) 104, 106, and 108 via communication links 105, 107, and 109, respectively, to transmit database management system commands and receive database management system command results, which are eventually transmitted to the remote client 100 via the mobile link 101.

The data replication agent 102 is preferably implemented by an agent computer 103 comprising an agent processor 118, software containing data replication agent instructions 120, and one or more fixed or removable data storage devices 122. Similarly, DBMSs 104, 106, and 108 are typically implemented by a server computer 124 comprising a processor 126, DBMS software 128, data replication server software 129, and one or more fixed or removable data storage devices 130. The remote client 100 can be implemented by a personal data assistant (PDA) 110, laptop, or other computer 112 (such as a notebook or laptop computer), or a paging device 114, which each typically comprise a processor 111, a remote client software instructions 113, and one or more fixed or removable data storage devices 115.

Software programs 113, 120, 128, and 129 may also be tangibly embodied in a computer-readable medium, e.g. one or more fixed and/or removable data storage devices 115, 122, and 130, respectively. Under control of an operating system, software programs 113, 120, 128, and 129 may be loaded from the data storage devices 115, 122, and 130 into the memory of their respective computers. These programs 113, 120, 128, and 129 comprise instructions which, when read and executed by the processors 111, 118, and 126 cause computers 112, 103, and 124 to perform the steps necessary to execute the steps or elements of the present invention.

Those skilled in the art will recognize that the exemplary environment illustrated in FIG. 1 is not intended to limit the present invention, and that alternative hardware environments may be used without departing from the scope of the present invention.

2. System Operation

Figure 2A:
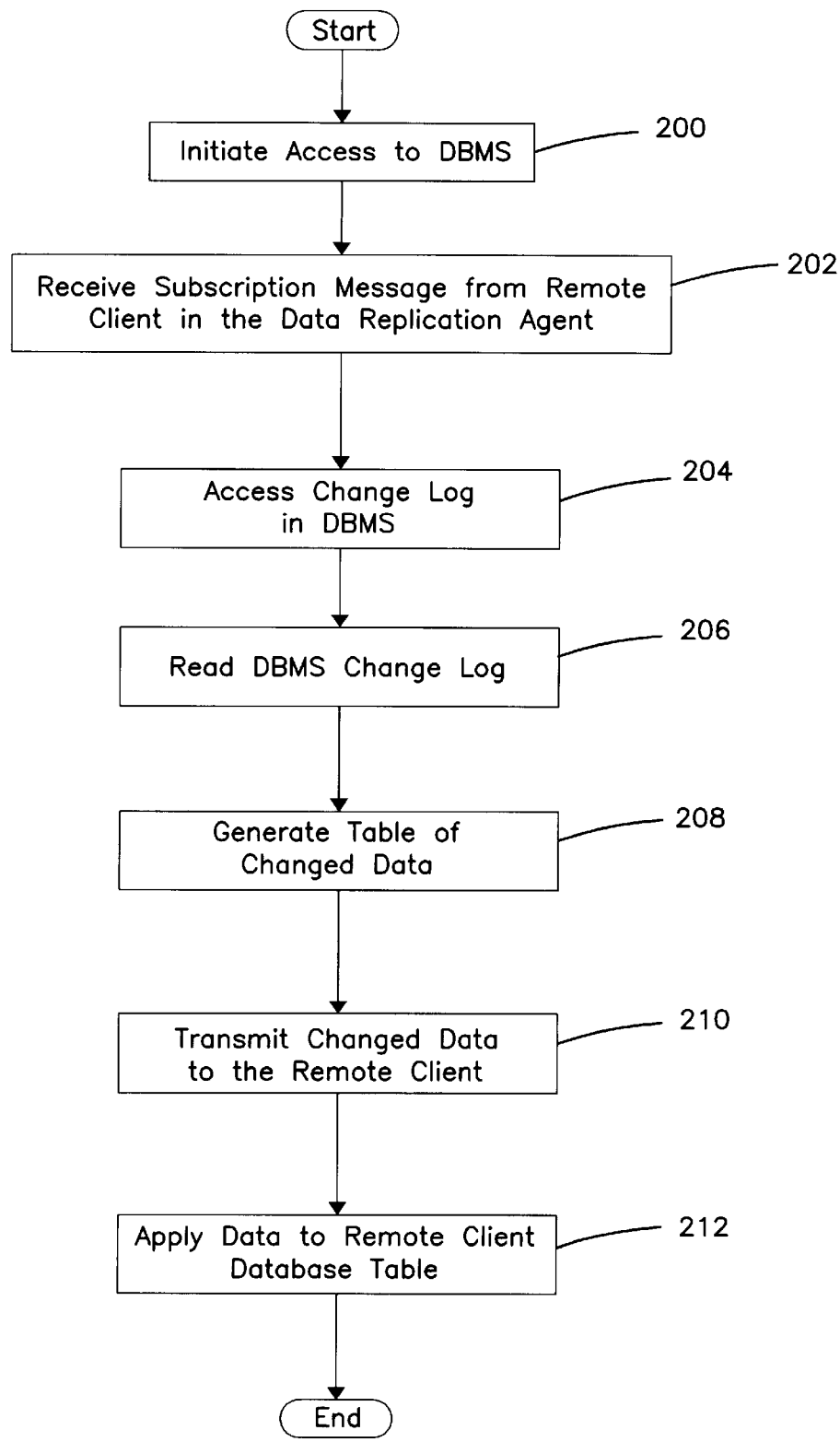
FIG. 2A is a flow chart showing the overall operation of the present invention.

FIG. 2A is a flow chart showing the overall operation of the present invention. Block 200 represents the remote client 100 initiating access with the DBMS 108. After access to the DBMS 108 is established, block 202 represents the data replication agent 102 receiving a subscription message from the remote client 100. The subscription message identifies one or more remote client database tables and a data replication period. The remote client database table comprises the data that the remote client 100 desires to be replicated. The data replication period defines how often the replication process should proceed. The subscription message may contain logical DMBS 108 commands, such as SQL statements. The remote client 100 may service more than one remote user. Accordingly, the subscription message may also contain information to identify which remote user is making the request.

Block 204 represents the data replication agent 102 accessing the change log in the DBMS 108. Thereafter, as represented in block 206, the data replication agent 102 reads the change log. Block 208 represents the data replication agent 102 using the remote client database table, and if selected, the logical database operators to generate a table of changed data. Block 210 represents the data replication agent transmitting the changed data to the remote client. Block 212 represents the data replication agent applying data to the remote client database. This process is performed by reconstructing the changes to the source database tables identified in the change log.

Figure 2B:
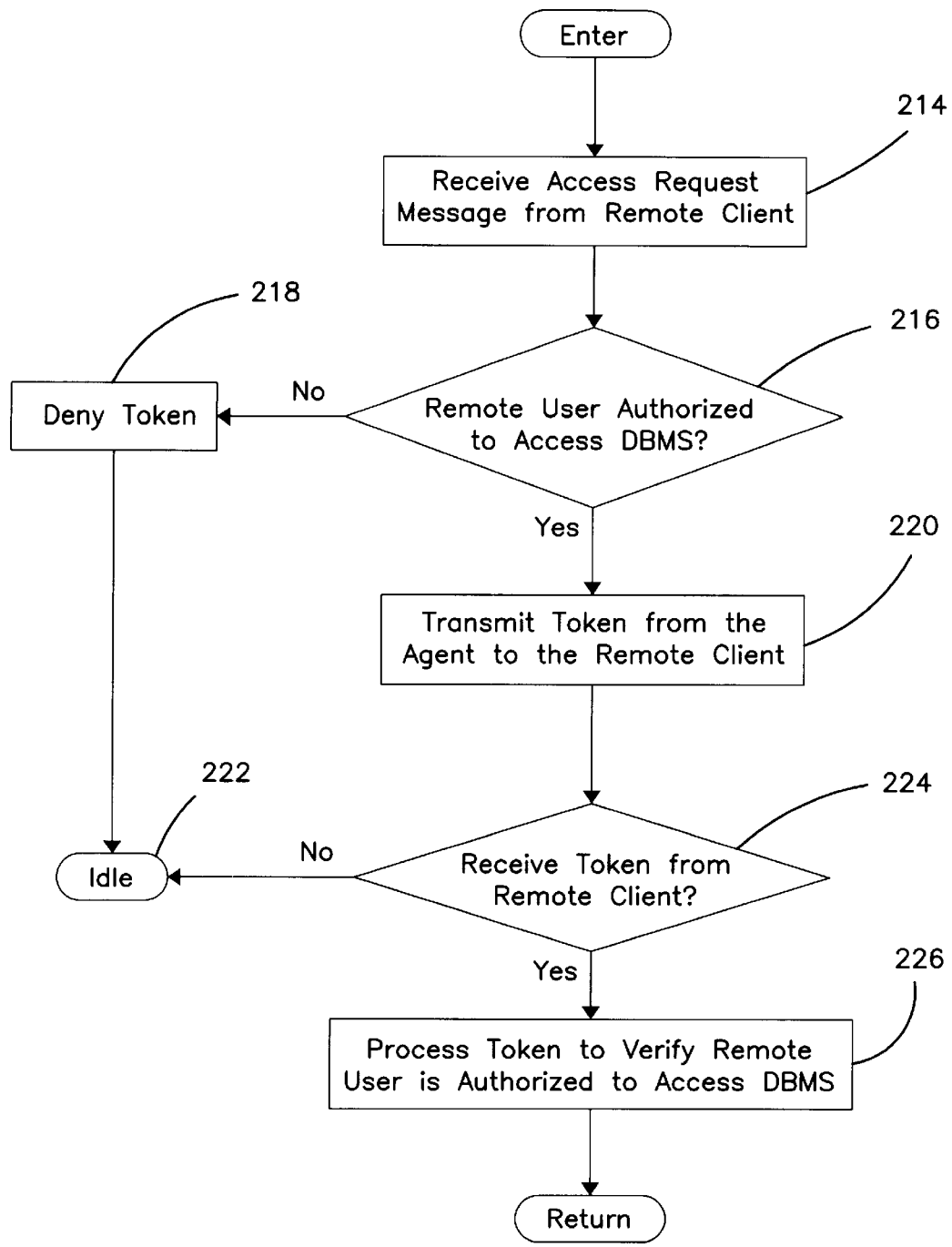
FIG. 2B is a flow chart showing the operations performed to initiate access to the database management system.

FIG. 2B is a flow chart illustrating the operations performed to initiate access to the DBMS 108. Block 214 represents the data replication agent 102 receiving an access request message from the remote client 100. Block 216 represents the data replication agent 102 determining whether the remote user is authorized to access the DBMS 108. If the remote user 100 is not authorized to access the DBMS 108, the data replication agent 102 denies remote user 100 a token, as illustrated in block 218. Data replication agent 102 processing thereafter returns to an idle state 222. If the remote user is authorized to access the DBMS 108, the data replication agent 102 transmits a token from the data replication agent 102 to the remote client 100, as shown in block 220. Block 224 represents the data replication agent 102 determining whether a token was received by the data replication agent 102 from the remote client 100. If a token was not received, the data replication agent 102 enters the idle state 222. If a token was received from the remote client 100, the data replication agent 102 processes the token to verify that the remote client 100 is authorized to access DBMS 108, as shown in block 226. In one embodiment, the token granted to the remote client 100 has a pre-specified life, after which it can no longer be used by the remote client 100 to access the DBMS 108. In another embodiment, the life of the token is determined from current or past database requests from the remote client 100. For example, if the remote client database request requires lengthy DBMS 108 processing, or if mobile link 101 availability is known by the data replication agent 102 to be intermittent or otherwise compromised, the data replication agent 102 grants a token to the remote client 100 with a longer life. By selecting token life based upon parameters supplied by the remote client 100, parameters known by the data replication agent 102 such as the availability of the mobile link 101 or the complexity of the DBMS 108 request, or the prior request history of the remote client 100, the data replication agent 102 may optimize the token life and minimize mobile link 101 communications.

Figure 2C:
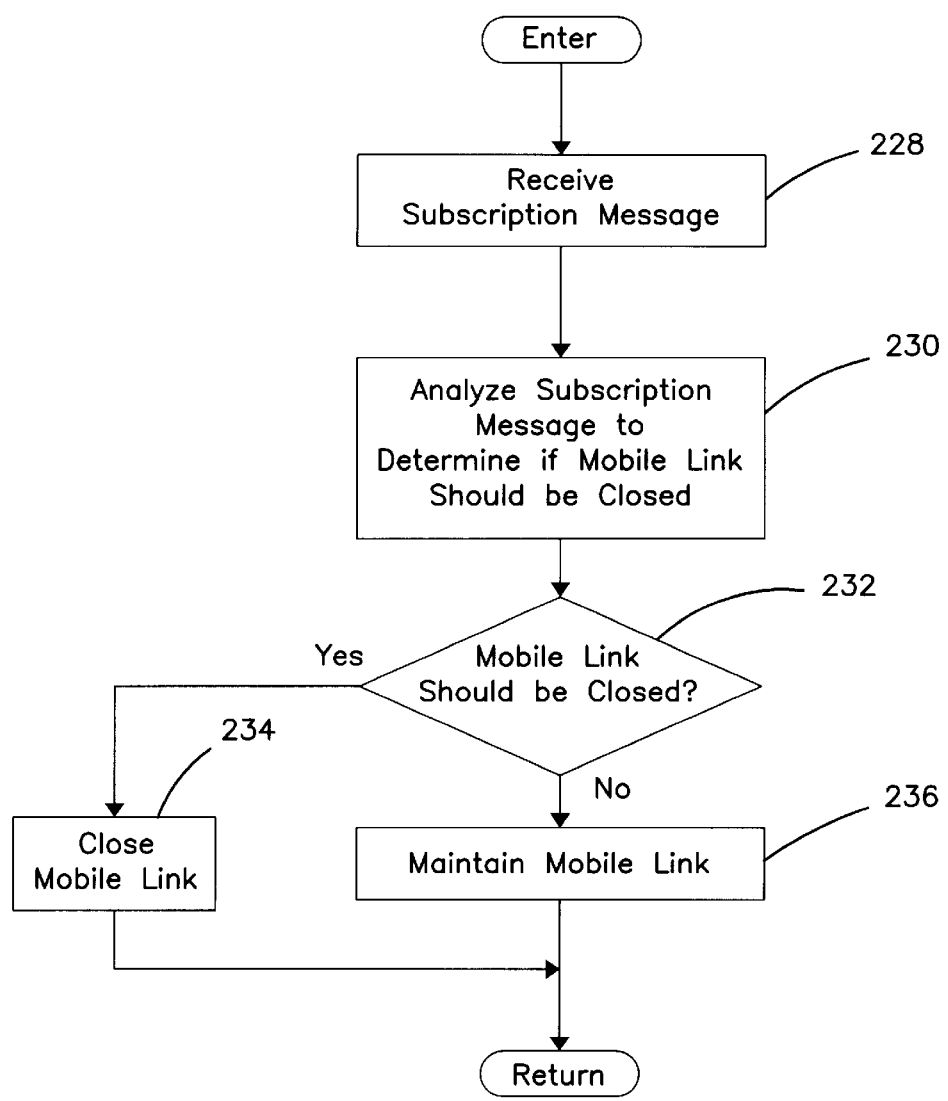
FIG. 2C is a flow chart showing the operations performed by the remote client to manage the mobile link.

FIG. 2C shows the operations performed by the remote client 100. Block 228 represents the remote client 100 receiving the subscription message from the data replication agent 102. Block 230 illustrates the remote client 100 reading and analyzing the subscription message to determine if mobile link 101 should be closed. If the mobile link should be closed 232, the remote client 100 closes the mobile link 101, as shown in block 234. If the subscription message analysis indicates that the mobile link 101 should remain open, block 236 maintains the mobile link 101.

Many different strategies can be employed to implement message trafficking between the remote client 100 and the data replication agent 102. For example, in one embodiment, a daemon 132 is invoked at the remote client 100 whenever required. The data replication agent 102 will either wait for a connection request from the daemon 132 or periodically contact the daemon 132 proactively. Once communications are established, the query result will be sent to and stored at the remote client 100, and the daemon 132 will notify the person making the database request of the query result. Message trafficking may also be implemented using a structured messaging system such as the IBM™ MQ Series. In this case, message queues 134 are defined in the remote client 100 and the data replication agent 102. A trigger is associated with the message queue 134 at the remote client 100. This trigger notifies the remote client 100 to invoke a query browser to display the query result once the result enters the message queue 134. Of course, in accordance with well known techniques, the remote client 100 can request that all mobile link 101 communications be suitably encrypted.

Figure 2D:
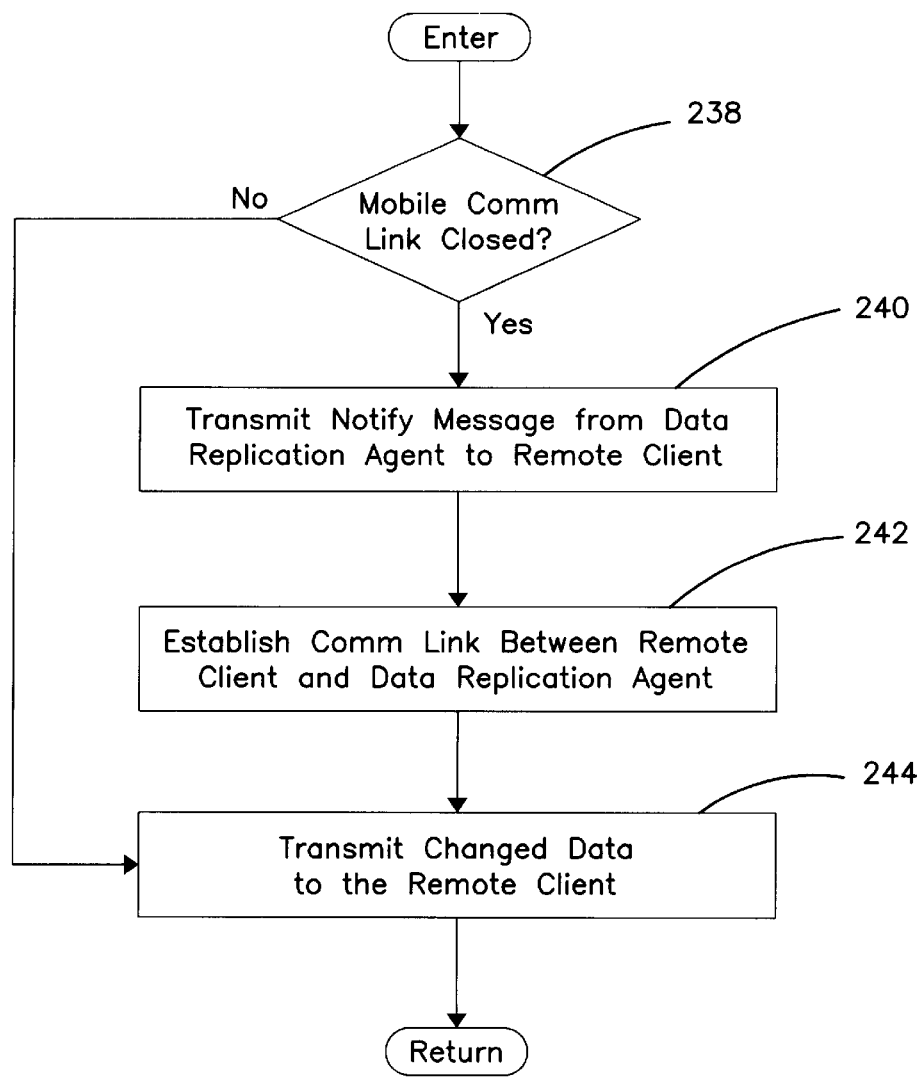
FIG. 2D is a flow chart showing the operations performed to transmit the changed data to the remote user.

FIG. 2D is a flow chart showing the operations performed to transmit the changed data to the remote client. As shown in block 238, if the mobile communications link 101 was not closed, the data replication agent 102 merely transmits the changed data to the remote client 100 as shown in block 244. If the mobile link 100 is not open, the data replication agent 102 transmits a notify message to the remote client 100, as shown in block 240. Block 242 illustrates the remote client 100 establishing a communication link between the remote client 100 and the data replication agent 242. After establishing communications, the changed data is transmitted to the remote client 100 as shown in block 244.

CONCLUSION

This concludes the description of the preferred embodiment of the present invention. In summary, the present invention discloses a method, apparatus, and article of manufacture for replicating data stored in source database tables in a database management system implemented by a server at a remote client implemented on a client computer. The method comprises the steps of receiving a subscription message specifying a remote client database table and a data replication period from the client computer, receiving a change log from the database management system at the agent, generating a table of changed data by using the change log, data replication period, and source database table to reconstruct changes to the remote client database table, and transmitting the changed data table to the remote client.

The foregoing description of the preferred embodiment of the invention have been presented for purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of replicating data stored in one or more source database tables in a database management system, performed by both a server computer and a client computer, comprising the steps of:

receiving a subscription message from the client computer at a data replication agent performed by an agent computer, the subscription message comprising a data replication request message specifying one or more remote client database tables and a client defined data replication period, wherein the client defined replication period defines how often the replication process should proceed;

receiving a change log from the database management system at the data replication agent, the change log identifying changes to the source database table during the data replication period;

generating a table of changed data at the data replication agent, comprising the step of reconstructing changes to the remote client database table during the data replication period using the change log, the data replication period, and the source database table; and transmitting the changed data from the data replication agent to a remote client.

2. The method of claim 1, further comprising the step of applying the changed data to the remote client database table.

3. The method of claim 1, wherein the data replication request message further comprises logical database operators.

4. The method of claim 1, wherein the step of transmitting the changed data to the remote client comprises the steps of:

transmitting a notify message to the remote client indicating that the table of changed data is generated;

receiving a data transmission message from the remote user, thereby establishing a communication link between the remote client and the data replication agent; and transmitting the changed data to the remote client.

5. The method of claim 1, wherein the subscription message and the changed data are communicated between the client computer and the data replication agent via a daemon invoked at the client computer.

6. The method of claim 5, further comprising the steps of:

periodically querying the daemon at the remote client to determine if any changed data is present; and applying the changed data to the remote client database table when changed data is present.

7. The method of claim 1, wherein the client computer further comprises a message queue associated with a trigger and a query browser to display the remote client database table, and the step of transmitting the changed data from the data replication agent to the remote client comprises the step of sending a message to the client computer to activate the trigger to invoke the query browser at the client computer.

8. An apparatus for replicating data stored in source database tables in a database management system, performed by both a server computer and a client computer, comprising:

an agent computer having a processor, a memory, and a data storage device;

means, performed by the agent computer, for receiving a subscription message from the client computer, the subscription message comprising a data replication request message specifying one or more user-selected remote client database tables and a client defined data replication period, wherein the client defined replication period defines how often the replication process should proceed;

means, performed by the agent computer, for receiving a change log from the database management system at the data replication agent, the change log identifying changes to the source database table during the data replication period;

means, performed by the agent computer, for generating a table of changed data at the data replication agent, comprising means for reconstructing changes to the remote client database table during the data replication period using the change log, the data replication period, and the source database table; and means, performed by the agent computer, for transmitting the changed data from the data replication agent to a remote client.

9. The apparatus of claim 8, further comprising means, performed by the client computer, for applying the changed data to the remote client database table.

10. The apparatus of claim 8, wherein the data replication request message further comprises logical database operators.

11. The apparatus of claim 8, wherein the means for transmitting the changed data from the data replication agent to the remote client comprises:

means, performed by the agent computer, for transmitting a notify message to the remote client indicating that the table of changed data is generated;

means, performed by the agent computer, for receiving a data transmission message from the remote client, thereby establishing a communication link between the remote client and the data replication agent; and means, performed by the agent computer, for transmitting the changed data to the remote client.

12. The apparatus of claim 8, wherein the subscription message and the changed data are communicated between the agent computer and the client computer via a daemon invoked at the client computer.

13. The apparatus of claim 12, further comprising:

means, performed by the client computer for periodically querying the daemon to determine if any changed data is present; and means, performed by the client computer, for applying the changed data to the remote client database table when changed data is present.

14. The apparatus of claim 8, wherein the client computer further comprises a message queue associated with a trigger and a query browser to display the remote client database table, and the means for transmitting the changed data from the data replication agent to the remote client comprises means for sending a message to the client computer to activate the trigger to invoke the query browser at the client computer.

15. A program storage device, readable by a computer having a processor, a memory, and a data storage device, tangibly embodying one or more programs of instructions executable by the computer to perform method steps of replicating data stored in source database tables in a database management system, performed by both a server computer and a client computer, the method comprising the steps of:

receiving a subscription message from the client computer at a data replication agent executed by an agent computer, the subscription message comprising a data replication request message specifying one or more remote client database tables and a client defined data replication period, wherein the client defined replication period defines how often the replication process should proceed;

receiving a change log from the database management system at the data replication agent, the change log identifying changes to the source database table during the data replication period;

generating a table of changed data at the data replication agent, comprising the step of reconstructing changes to the remote client database table during the data replication period using the change log, the data replication period, and the source database table; and transmitting the changed data from the data replication agent to a remote client.

16. The program storage device of claim 15, wherein the method steps further comprise the step of applying the changed data to the remote client database table.

17. The program storage device of claim 15, wherein the data replication request message further comprises logical database operators.

18. The program storage device of claim 15, wherein the method step of transmitting changed data to the remote client comprises the method steps of:

transmitting a notify message to the remote client indicating that the table of changed data is generated;

receiving a data transmission message from the remote client, after establishing a communication link between the remote client and the data replication agent; and transmitting the changed data to the remote client.

19. The program storage device of claim 15, wherein the subscription message and the changed data are communicated between the client computer and the data replication agent via a daemon invoked at the client computer.

20. The program storage device of claim 19, wherein the method steps further comprise the step of applying the changed data to the remote client database table when changed data is present.

21. The program storage device of claim 15, wherein the client computer comprises a message queue associated with a trigger and a query browser to display the remote client database table, and the method step of transmitting the changed data from the data replication agent to the remote client comprises the method step of sending a message to the client computer to activate the trigger to invoke the query browser at the client computer.

* * * * *